United States Patent [19]
Gifford

[11] Patent Number: 4,726,207
[45] Date of Patent: Feb. 23, 1988

[54] PORTABLE STEERING COLUMN LOCKING APPARATUS

[76] Inventor: Mark Gifford, 8502 Woodcamp Dr., Houston, Tex. 77088

[21] Appl. No.: 4,067

[22] Filed: Jan. 16, 1987

[51] Int. Cl.[4] .............................................. E05B 17/14
[52] U.S. Cl. ......................................... 70/428; 70/237
[58] Field of Search ...................... 70/18, 85, 91, 104, 70/181, 183, 209, 229, 230, 232, 237, 423, 427, 428, 371; 16/380, 379, 353

[56] References Cited

U.S. PATENT DOCUMENTS

| | | | |
|---|---|---|---|
| 2,221,082 | 11/1940 | FitzGerald . | |
| 2,488,688 | 11/1949 | Simmons | 16/353 |
| 3,401,543 | 9/1968 | Lewis | 70/183 |
| 3,464,241 | 9/1969 | Wellekens . | |
| 3,665,738 | 5/1972 | Pescuma et al. | 70/237 |
| 3,711,894 | 1/1973 | Walters . | |
| 3,811,303 | 5/1974 | Robertson | 70/237 |
| 3,827,266 | 8/1974 | Walters | 70/104 |
| 3,899,905 | 8/1975 | Walters | 70/91 |
| 3,916,658 | 11/1975 | Barry . | |
| 3,921,422 | 11/1975 | Walters | 70/104 |
| 3,940,957 | 3/1976 | Walters | 70/104 |
| 4,062,193 | 12/1977 | Deleto | 70/428 |
| 4,104,895 | 8/1978 | Tankel | 70/417 |
| 4,134,279 | 1/1979 | Ross | 70/18 |
| 4,167,222 | 9/1979 | ElBindari | 70/237 |
| 4,187,706 | 2/1980 | Hill | 70/428 |
| 4,296,615 | 10/1981 | Zoor | 70/181 |
| 4,426,859 | 1/1984 | Floyd | 70/18 |
| 4,541,256 | 9/1985 | Green | 70/232 |
| 4,559,795 | 12/1985 | Zagoroff | 70/422 |
| 4,598,562 | 7/1986 | Freeman | 70/417 |

Primary Examiner—Robert L. Wolfe
Attorney, Agent, or Firm—Vaden, Eickenroht, Thompson & Boulware

[57] ABSTRACT

A portable steering column locking apparatus in two pieces for surrounding the steering column of an automotive vehicle and specifically enclosing the ignition switch and the skin of the steering column beneath which the ignition control rod is located. The cylinder operates in a bolt wing and a striker wing part that cannot be pried apart because of housing projections fitting respectively within side recesses in the wings. The locking cylinder has a carbon steel crosspiece deadbolt operating within an internal "F" groove in the bolt wing and therefore cannot be defeated by common tools used to extract cylinder tools. The hinge of the housing pieces is sealed by welding against access.

8 Claims, 4 Drawing Figures

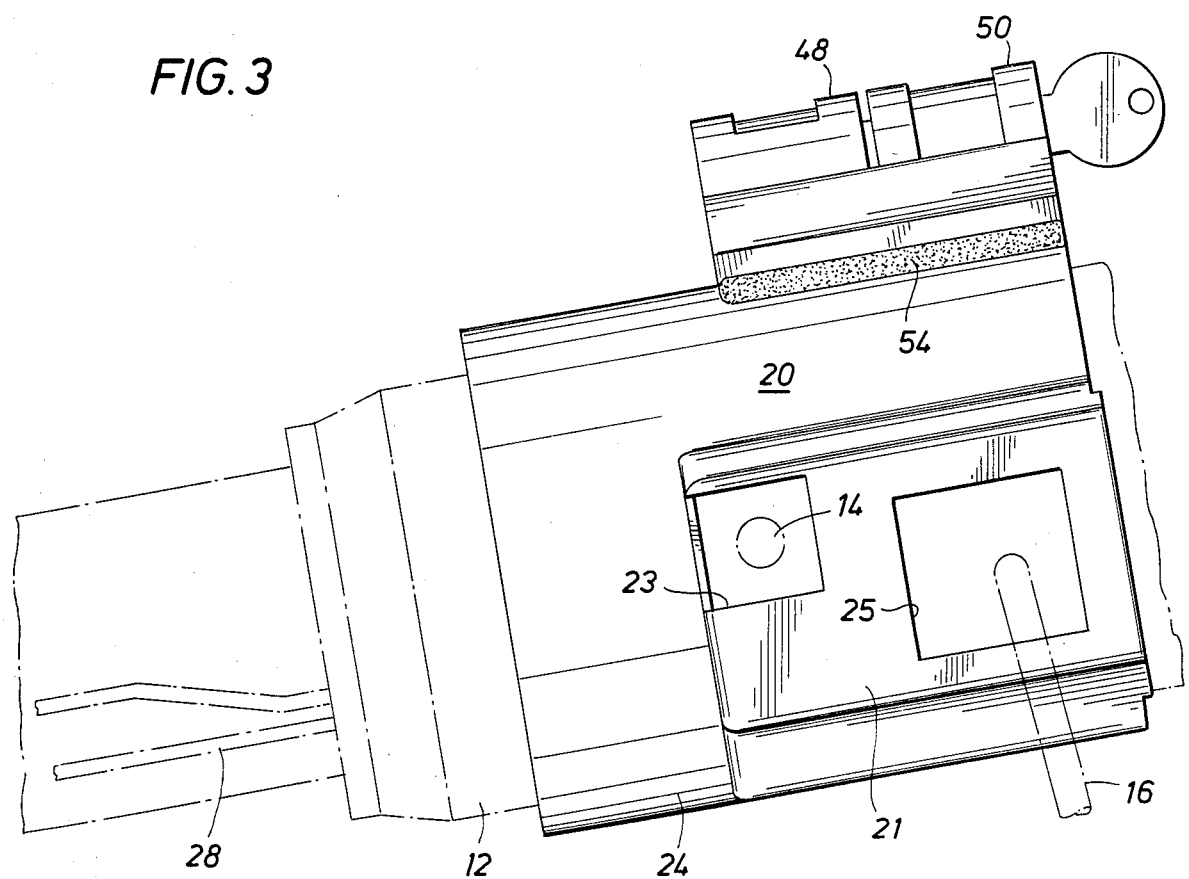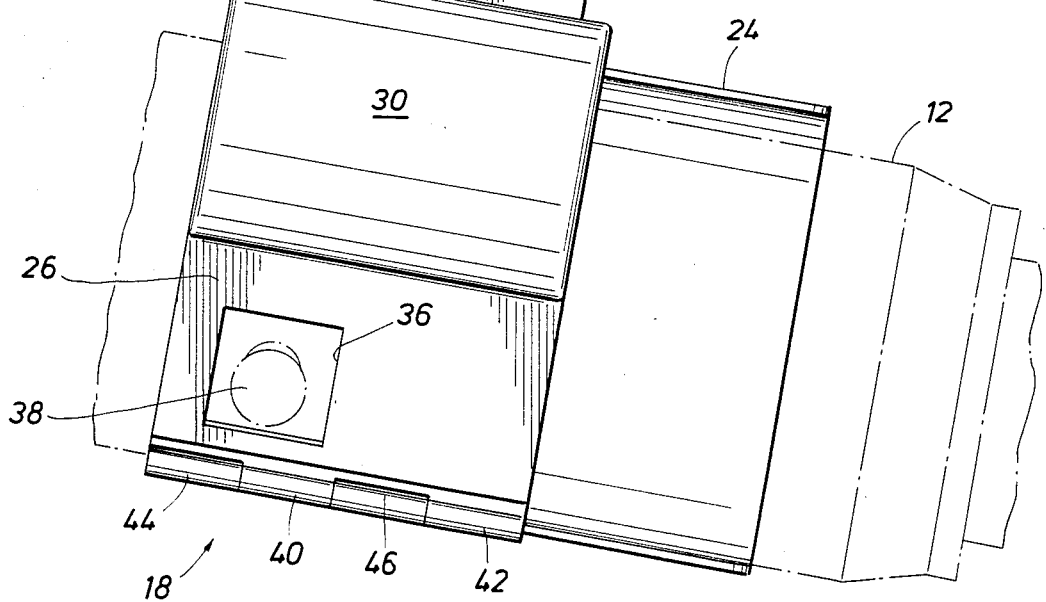

PORTABLE STEERING COLUMN LOCKING APPARATUS

BACKGROUND OF THE INVENTION

1. Field of the Invention

This invention pertains to a theft control device for an automotive vehicle and more specifically to a portable device attachable to the steering column of such a vehicle to render inaccessible both the ignition switch and the skin of the steering column, the two most vulnerable locations for automotive thievery.

2. Description of the Prior Art

The ordinary way that most persons employ to lock their automobiles against thieves is to lock the ignition switch and the doors of the automobile. However, is is well-known that such precautions, although somewhat successful against amateur thieves, are virtually no deterrent at all to professional car thieves. Unfortunately, the number of thefts and the number of professional thieves appears to be ever on the increase. Hence, the number of persons that are capable of stealing an automobile in spite of the doors and ignition switches being locked is also on the increase.

It is also true that there are more very expensive automobiles being driven than ever before. Hence, the loss of an automobile by virtue of a car theft is a more expensive loss to the owner, on average, than ever before. It is well-known, for example, that some expensive models are "in demand" by car thieves and, therefore, are more subject to being stolen than other models of automobiles. Car thieves roam the streets and parking lots looking for certain models of automobiles to steal.

Because of this, certain prior art devices have been made to protect against thievery at the ignition switch. However, the vast majority of such devices are very vulnerable to attack. For example, there are ignition switch covers that are bolted merely by a padlock. A padlock, of course, can be quickly cut off by a bolt cutter.

Some of the devices that have been employed are designed to be permanently installed. Hence, when the automobile is to be operated, even by its owner, the device remains attached to the steering wheel and either remains in place, as is, or hangs down in place, making an unsightly appendage to what is otherwise usually a very stylish interior appearance.

The two main weaknesses, from an anit-theft point of view, against starting an automobile without a proper ignition key are the design of the ignition switch and the vulnerability to access of the control rod inside the steering column. The ignition switch is usually held in place by a side set screw in its housing opening. Hence, it is easily punched or pulled out by a tool inserted in the keyed cylinder. Once the cylinder is removed, then the control rod can be manually operated to start the car.

If a thief wishes, or if for some reason the locking cylinder cannot be removed in the above fashion, he can also gain access to the control rod by penetrating the skin of the steering column alongside the control rod. Once access to the rod has been made, then it can be cut or unhooked from its switch connection so that it can be manipulated to start the car without having to have the proper key.

To be a deterrent to most thieves it is necessary to protect against both the thief who attacks the ignition lock cylinder as well as the thief who attacks the skin of the steering column. Further, the lock of the anti-theft device has to be highly impregnable to attack. It is further desirable that the device be portable so that it can be removed during use of the automobile by its rightful operator so that it does not detract from the appearance of the automobile. Finally, it is highly desirable that the device be recognized by potential thieves so that they will not even break into the automobile door or window to try to steal the automobile, thereby preventing any damage from occurring even in an unsuccessful theft attempt.

Therefore, it is a feature of the present invention to provide an improved locking apparatus for an automobile steering column that renders inaccessible through common means both the ignition switch and the skin of the steering column adjacent the ignition control rod.

It is another feature of the present invention to provide an improved locking apparatus for an automobile steering column that is so formidable and recognizable that potential thieves will be deterred without forcing entry into a locked vehicle protected by such a device.

It is still another feature of the present invention to provide an improved locking apparatus for an automobile steering column that employs a virtually unassaultable locking mechanism.

It is yet another feature of the present invention to provide an improved locking apparatus for an automobile steering column that protects both the ignition switch and the skin of the steering column from theft attack, while nevertheless being removable or portable and yet substantial in appearance and therefore relatively invulnerable to attack.

SUMMARY OF THE INVENTION

The apparatus described and illustrated herein is a portable steering column locking apparatus for an automotive vehicle steering column that includes an ignition switch thereon, which, in turn, operates an ignition control rod that is aligned next to the inside wall or skin of the column. The apparatus is generally defined by a two-piece housing, hinged together, that wraps around the steering column. Part of one piece covers the ignition switch entirely. The other has openings for the control levers, but otherwise provides a thick, steel cover for the column that is not readily penetrable by conventional tools. The locking cylinder of the apparatus operates within bores located within wings of the housing that align when the apparatus is in its locked condition. The bolt wing includes a bore slotted to receive a cylinder having a hardened, preferably carbon steel deadbolt crosspiece. The other wing, the striker wing, includes a recessed bore that leaves a substantial amount of metal to prevent the cylinder from reverse end attack. The hinges of the two pieces include interengaged knuckle parts and a hinge pin, the pin being sealed from external access.

BRIEF DESCRIPTION OF THE DRAWINGS

So that the manner in which the above-recited features, advantages and objects of the invention, as well as others which will become apparent, are attained and can be understood in detail, more particular description of the invention summarized above may be had by reference to the embodiment thereof that is illustrated in the appended drawings, which drawings form a part of the specification. It is to be noted, however, that the appended drawings illustrate only a preferred embodiment of the invention and are therefore not to be consid-

IN THE DRAWINGS

Figure 1:
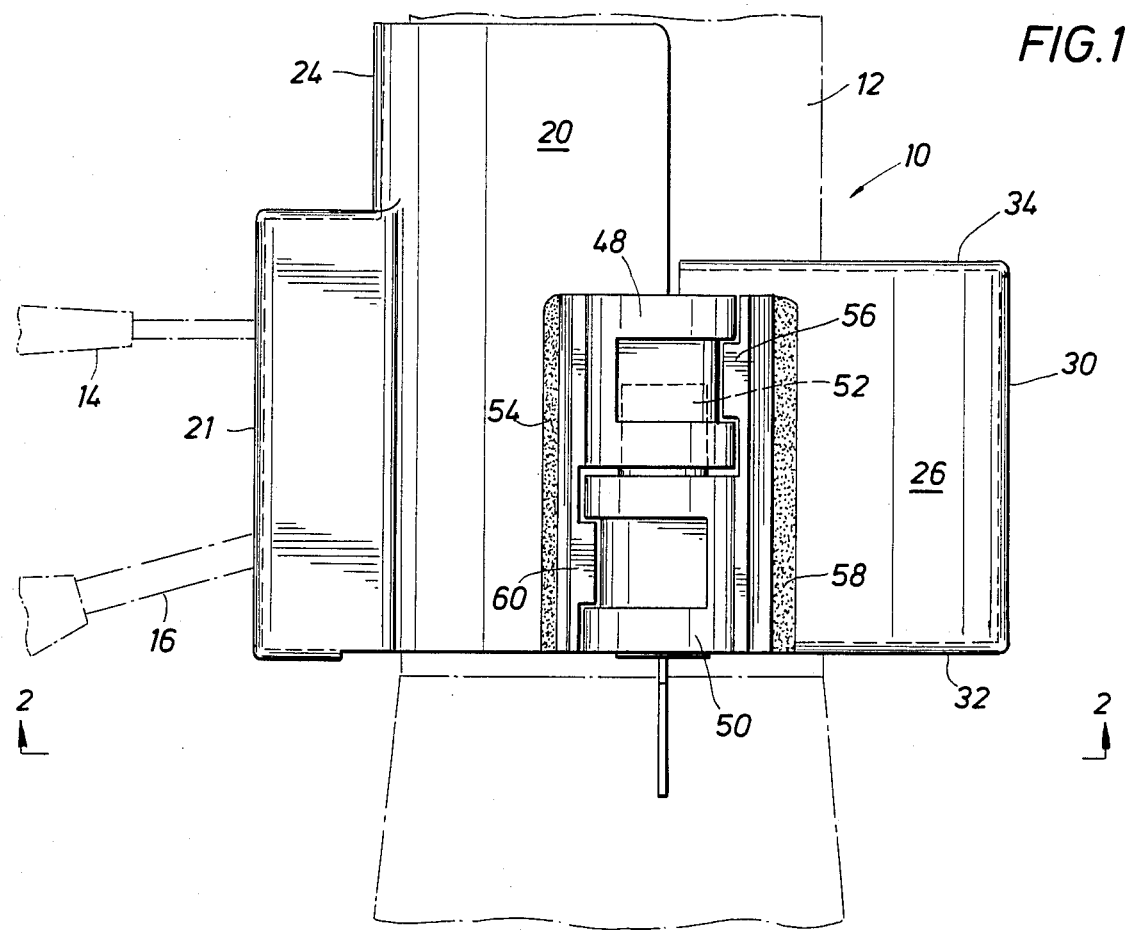

FIG. 1 is a top view of a preferred embodiment of the present invention.

Figure 2:
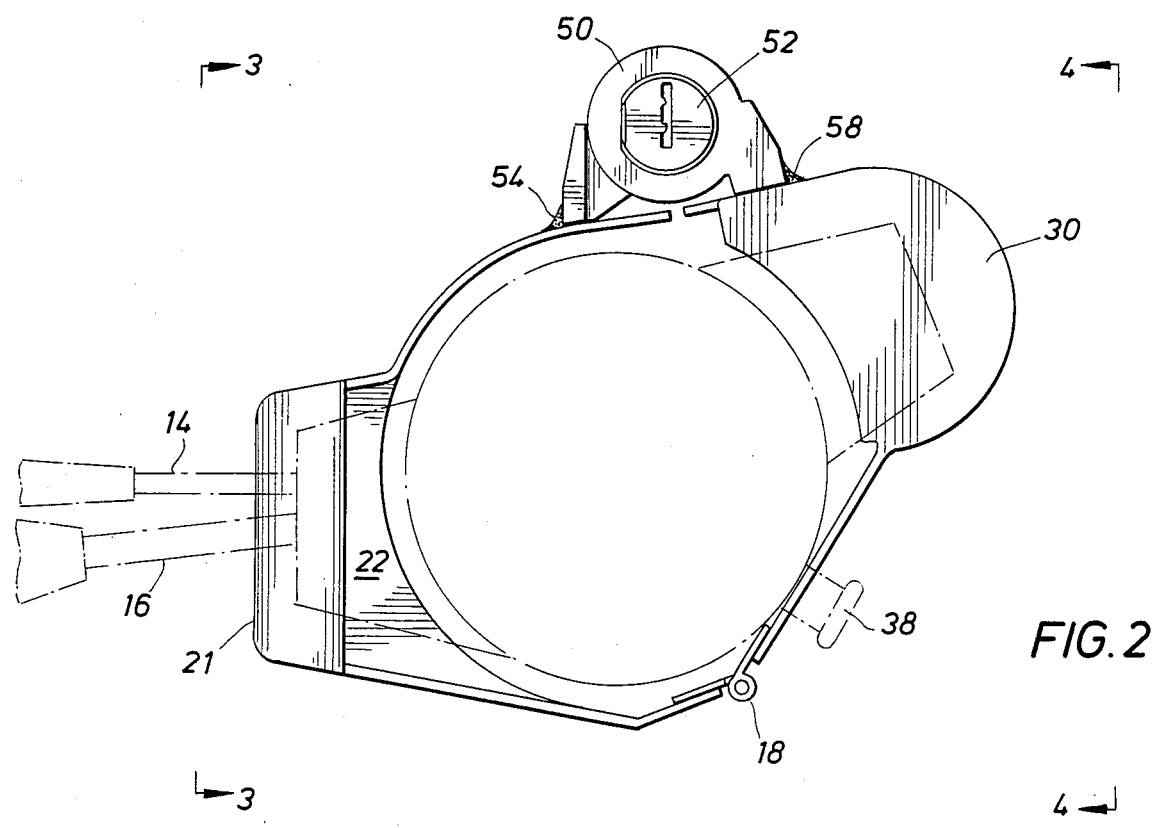

FIG. 2 is an end view of the embodiment shown in FIG. 1 taken at line 2—2 of FIG. 1.

FIG. 3 is a left side view of the embodiment shown in FIG. 1 taken at line 3—3 of FIG. 2.

FIG. 4 is a right side view of the embodiment shown in FIG. 1 taken at line 4—4 of FIG. 2.

DESCRIPTION OF THE PREFERRED EMBODIMENT

Now referring to the drawings, and first to FIG. 1, a top view of a preferred embodiment of the present invention is illustrated. Steering column locking apparatus 10 is shown in its locked condition after surrounding steering column 12 shown in dash lines. The steering column, which is illustrated, is common for instance to late model General Motors automobiles and includes a keyed ignition switch hidden from view in FIG. 1 but located on the right side of the steering column. Control levers, such as turn indicators, tilt control for the steering wheel, and the like are also shown in dotted section at 14 and 16. These controls are attached to the left side of steering column 12. Although these features are found on late model General Motors automobiles, they are common to many, many vehicles makes and models and the invention is not limited to use only with late model General Motors automobiles.

Also located inside of the steering column is a control rod that moves longitudinally to start the car. The end of the rod near the ignition switch is connected to a short switch rod and the distant end is connected to the electrical solenoid switch. When the ignition switch is operated by the turning of the key, the switch rod moves the control rod, which, in turn, actuates the solenoid switch.

Locking apparatus 10 generally comprises a two-piece housing hinged together at hinge 18, best shown in FIGS. 2 and 4. The left hand piece of locking apparatus 10, identified by reference numeral 20, is generally semi-circular and is designed to enclose roughly the left hand portion of steering column 12 between the portion of the steering column adjacent the steering wheel and a portion the steering column adjacent the front bulkhead of the vehicle.

It is apparent that this distance varies between models of automobiles and, therefore, locking apparatus 10 is not universally sized for all cars. However, many models are closely similar in their sizing and the same locking apparatus will fit more than one model of car. For example, practically all General Motor automobiles of the same year will fit with the same sized locking apparatus 10.

As best shown in FIG. 3, a control lever cover portion 21 of piece 20 is shaped to fit around protruding base or bases 22 of control levers 14 and 16. Also, as shown in Fi. 3, openings are included in this portion of piece 20 to permit the control levers to project therethrough without exposing very much of the adjacent steering column to outward access.

Also as shown in FIG. 1, left hand piece 20 includes an extension 24 for covering more of steering column 12 than right hand piece 26 of locking apparatus 10. The reason for this is best shown in FIG. 3. Extension 24 covers the skin of steering column 12 underneath which ignition control rod 28 is located. It is this extension 24 that is the most critically sized to fit with the length of the steering column of a particular automobile.

Right hand piece 26 includes a housing portion 30 that covers the entire ignition switch located on the side of steering column 12. It will be seen that housing cover portion 30 includes a front end 32 and a rear end 34 so as to make access to the ignition switch virtually impossible from any direction. There is an opening 36 in right hand piece 26 to allow hazard switch 38 to project therethrough. This feature is best shown in FIG. 4. Wear pads of felt or other suitable material are glued to the inside of the housing to protect the steering column paint from being scraped off.

Now referring to FIG. 4 for a description of hinge 18, it will be seen that left hand piece 20 includes two knuckle parts 40 and 42 interengaged with similar knuckle parts 44 and 46 of right hand piece 26. A hinge pin is accommodated through the center opening of the four knuckle parts to provide the hinge action and knuckle parts 42 and 44 are welded shut on their ends so as to prevent access to the hinge pin. Furthermore, each of the knuckle parts is welded on its side to the body of the piece of which they are a part so that these knuckle parts cannot be forceably unrolled.

Now referring to the locking arrangement for the locking apparatus, it will be seen that there are two wing housing parts, namely, striker wing 48 and bolt wing 50, in which lock cylinder 52 operates in a manner hereafter described. Striker wing housing part 48 is generally circular in cross-section and is welded on its side by weld 54 to the housing of left hand piece 20. Externally the periphery of wing housing part 48 is slightly reduced or recessed on the right side so as to permit engagement of projection 56 attached to right hand piece 26.

In similar fashion, bolt wing housing part 50 is also generally circular in cross-section and is attached to right hand piece 26 by weld 58. Its periphery is also slightly reduced on the left side to accommodate projection 60 attached by welding to left hand piece 20. It will be seen that when pieces 20 and 26 are closed around steering column 12, wing parts 48 and 50 are axially aligned and are prevented from being pried apart by the interplay between projections 56 and 60 within the side reduced peripheries of parts 48 and 50, respectively.

Internally, wing part 50 is bored all the way through to accommodate locking cylinder 52. However, wing part 48 is bored or recessed only partly to accommodate only the end of extended locking cylinder 52, which cylinder is long enough to extend only about half way into part 48 when it is extended to its locking condition. The actual longitudinal dimension of each part 48 and 50 is approximately two inches. Therefore, there is approximately one inch of solid metal which is not bored through in wing part 48 that closes off the bore or recess therein and makes access to locking cylinder 52 impossible from the end opposite its bore opening.

Wing part 50 internally includes an "F" groove in the inside wall for receiving a deadbolt crosspiece which is part of locking cylinder 52. Preferably, this crosspiece is made of carbon steel or other extremely hard material. When the housing parts are open the locking cylinder can only be removed from the inside end of part 50 because of the interplay of the crosspiece and the "F" slot. That is, the locking cylinder is removable only from the bore end adjacent part 48 when the two parts are brought together as shown in FIG. 1. That is because the "F" slot opens only to that end of the bore. The crosspiece is of substantial diameter and therefore cannot be punched out or removed from the key end of the cylinder, as ignition switches are capable of being removed, as described above.

It is also noted that the top of the "F" slot being connected with the crosspiece when the locking cylinder is in its retracted or unlocked position, prevents the cylinder from moving forward.

There is a slight elongated recess on the side of the locking cylinder for accepting a side-advancing set screw to hold the locking cylinder housing in place, but this locking screw is not the piece that prevents the removal of the locking cylinder by force.

Although a general description has been given above of the operation of the cylinder, a detailed description of the operation is disclosed in U.S. Pat. No. 3,827,266, Walters, issued Aug. 6, 1974, which patent is incorporated by reference herein for all purposes. The Walters patent describes a lock which is marketed under the trademark TUFLOC, a registered trademark of Electroline. The TUFLOC lock incorporates a locking cylinder marketed under the trademark MEDECO, a cylinder which has proved to be virtually pick proof and utilizes special key blanks which insures stringent key control.

It will be seen from the above description, that locking apparatus 10 is virtually unassailable at the locking cylinder, at the housing parts in which the cylinder operates, at the portion covering the ignition switch, and at the portion covering the skin of the steering column opposite the ignition control rods.

The preferred material for the locking apparatus housing is hardened steel and the preferred color for the housing is red.

It should be noted that red is a universal color signifying "stop". Since the entire locking apparatus is virtually invulnerable to being broken into by car thieves, potential car thieves will most likely not attempt to break into the automobile door or window in order to try to steal an automobile protected by the apparatus which has been described herein. The red color will be eye catchiing and itself will be a deterrent to car thieves.

It should be noted that the lawful operator of the vehicle will remove locking apparatus 10 at the time of operating the car, putting the apparatus either in the glove compartment, under the seat or in the trunk so that it will be out of the way and will not detract from the internal aesthetics or appearance of the interior design of the vehicle.

Although the locking apparatus has been described with respect to General Motors automobiles, it should be again noted that any vehicle can be protected using the locking apparatus that is designed to fit therewith. This includes any vehicle that has an ignition switch on the side of the steering column and an ignition control rod operating internally to the steering column and adjacent the skin on the left hand side to the column as the column appears from the top. As has been previously mentioned, the skin of the column is protected to prevent access to the control rod. Once accessed, the rod can be cut or disconnected from the switch and the car started by manipulating the rod. Moreover, not only automobiles, by also jeeps, pickups, station wagons, trucks and the like can be similarly protected.

While a preferred embodiment of the invention is generally been described and specific variations have been discussed, it will be understood that the invention is not limited thereto.

What is claimed is:

1. A portable steering column locking apparatus for an automotive vehicle steering column including an ignition switch thereon that operates an ignition control rod therein, comprising a two-piece housing for encircling the steering column of the vehicle, said housing covering the skin of the column to prevent access to the starting control rod of the ignition system, said housing also covering the ignition switch, a hinge for joining the two pieces of the housing together, said hinge being sealed by the pieces of said housing, a lock cylinder having a deadbolt crosspiece, one of said pieces of said housing having a bore for receiving said lock cylinder, said bore being internally slotted for cooperating with said deadbolt crosspiece to permit advancement and locking of said lock cylinder, the other of said pieces of said housing including a locking recess that aligns with said bore for cooperating with said cylinder when said cylinder is advanced in its locked position.

2. A portable steering column locking apparatus in accordance with claim 1, wherein said locking recess is closed at its end opposite the recess opening.

3. A portable steering column locking apparatus in accordance with claim 1, wherein said housing pieces includes interengaging knuckle parts and a hinge pin therethrough, the knuckle part at each end being sealed to prevent access to said hinge pin.

4. A portable steering column locking apparatus in accordance with claim 1, wherein said bore is included in a bolt wing housing part on a first of said housing pieces and said locking recess is included in a striker wing housing part on the second of said housing pieces, said bolt and striker wing housing parts being in alignment to permit said lock cylinder to advance to its locked position.

5. A portable steering column locking apparatus in accordance with claim 3, wherein said wing housing parts are flushedly aligned when said lock cylinder is locked.

6. A portable steering column locking apparatus in accordance with claim 1, wherein one of said housing pieces includes openings for receiving control levers related to the operation of the vehicle.

7. A portable steering column locking apparatus in accordance with claim 1, wherein the part of the housing covering the ignition switch fits flush against the steering column in front of and behind the ignition switch.

8. A portable steering column locking apparatus in accordance with claim 1 for fitting a steering column having an emergency hazard light switch thereon, wherein one of said housing pieces includes an opening for providing access to the emergency hazard light switch.

* * * * *